United States Patent [19]
Smith

[11] 4,022,979
[45] May 10, 1977

[54] AUTOMATIC IN-SERVICE DIGITAL TRUNK CHECKING CIRCUIT AND METHOD

[75] Inventor: Nicholas Kimbrough Smith, Naperville, Ill.

[73] Assignee: Bell Telephone Laboratories, Incorporated, Murray Hill, N.J.

[22] Filed: Dec. 29, 1975

[21] Appl. No.: 645,195

[52] U.S. Cl. .................. 179/15 BF; 179/175.2 R
[51] Int. Cl.² ................................. H04J 3/14
[58] Field of Search ...... 179/15 BF, 15 AT, 18 GF, 179/18 J, 175.2 R, 175.23, 175.25

[56] References Cited
UNITED STATES PATENTS

| | | | |
|---|---|---|---|
| 3,652,803 | 3/1972 | Joel | 179/18 J |
| 3,683,115 | 8/1972 | Schellenberg | 179/15 BF |
| 3,823,269 | 7/1974 | Saito | 179/15 BF |
| R27,798 | 10/1973 | Laane | 179/18 GF |

Primary Examiner—David L. Stewart
Attorney, Agent, or Firm—Howard R. Popper; Frederick W. Padden

[57] ABSTRACT

The integrity of switched, time-division multiplexed digital trunks in a telephone switching system is verified on an individual and in-service basis wherein the digital check is accomplished incident to the conventional D.C. network path continuity verification by the switching system common controller. The terminal circuits serving the channel allow a common multiplexer-demultiplexer to insert a test code during the allocated time slot of the channel being tested and detect the same test code from a similarly-functioning testing arrangement at the far end of the digital channel. Failure of a comparison between sent and received codes results in the inhibition of a positive D. C. path check indication to the common controller.

18 Claims, 9 Drawing Figures

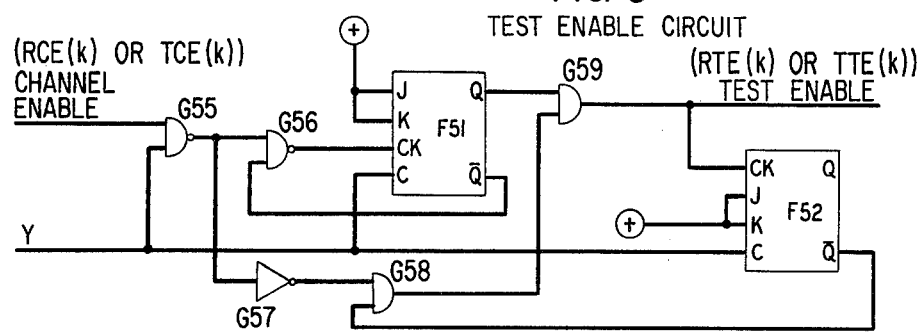
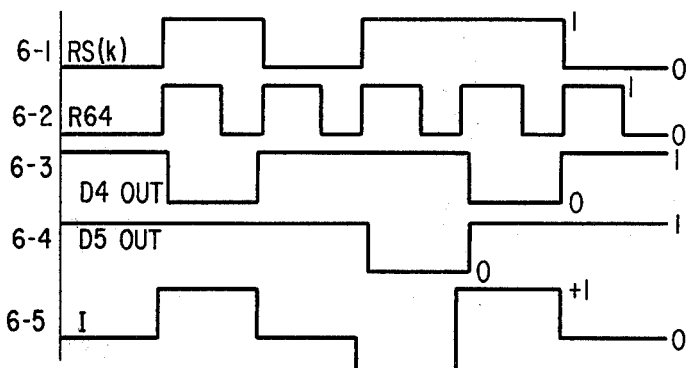
ASSUMING J-K FLIP-FLOP D72 TO HAVE BEEN RESET
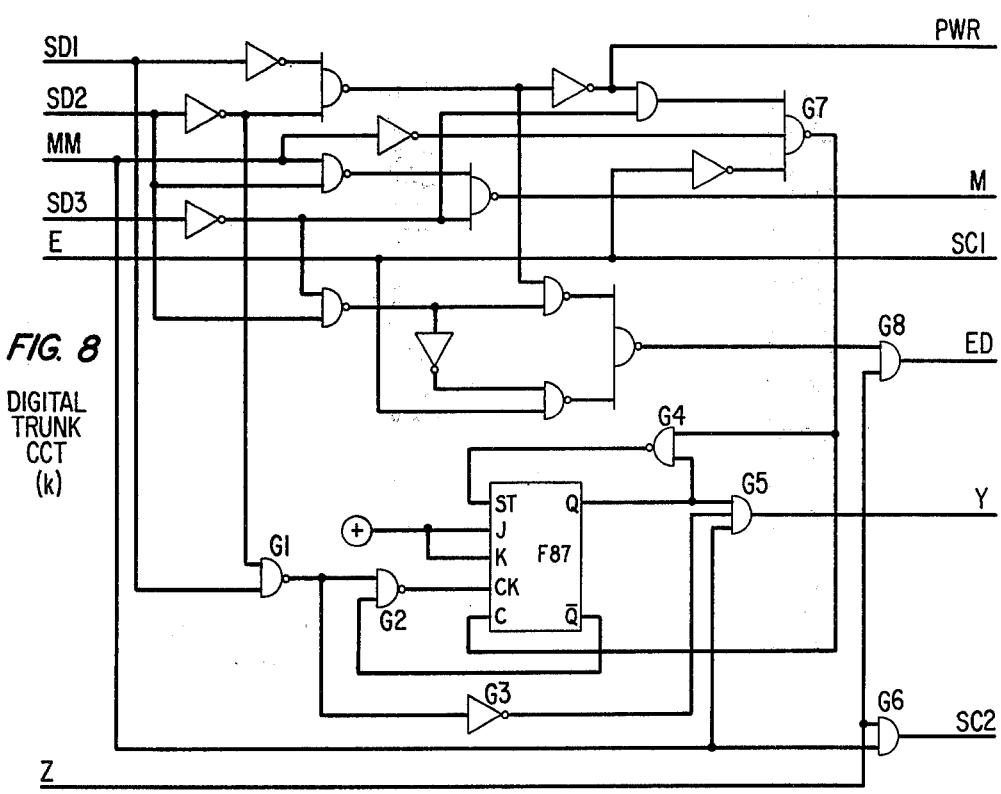

AUTOMATIC IN-SERVICE DIGITAL TRUNK CHECKING CIRCUIT AND METHOD

BACKGROUND OF THE INVENTION

This invention relates to multiplex transmission systems and, more particularly, to the switching of time-division multiplexed signals through space-division telephone central offices.

In the past, it has been proposed to digitally switch the telephone calls carried by time-division multiplex lines, such as the well-known T1 carrier system manufactured by the Western Electric Company, through conventional space-division switching offices. For example, A. E. Joel, Jr. U.S. Pat. No. 3,652,803 issued Mar. 28, 1972 teaches that time-division multiplex signals may be demultiplexed and digitally transmitted cross-office over as many physical, i.e., space-division, paths as there are time-division multiplex channels in a frame; provided that each such space-division path has a bit repetition rate low enough to avoid crosstalk. Of course, the bit repetition rate must be high enough so that all of the information is transmitted cross-office before the end of the frame interval.

In a conventional space-division telephone switching office a cross-office transmission path check is performed incident to the setting up of the connection and prior to the placing of the path in the talking state. This test verifies the integrity of the transmission path extending from the incoming trunk over the network crosspoints to the outgoing trunk. As described in either A. J. Busch U.S. Pat. No. 2,585,904 issued Nov. 12, 1952 (relating to the well-known No. 5 crossbar system) or in the September 1964 issue of the *Bell System Technical Journal* (relating to the No. 1 Electronic Switching System), such a continuity check is accomplished under the direction of common control. In a cross bar system the common control is known as a marker; in an electronic switching system the common control is known as a processor. In either case, the off-hook state of the trunks is verified and when successfully completed, common control allows the call to be cut-through to the talking state. In both cases the continuity check is a D.C. check.

In the aforementioned Joel patent system each of the cross-office channels employs a digital trunk circuit at each of its ends. The digital trunk circuit includes shift registers and flip-flops for storing and responding to the digital content of the transmitted information. The conventional D.C. transmission path check performed by the central office for analog trunks provides no indication of how these digital components in the cross-office channel are functioning.

In a conventional T1 carrier, analog-switched transmission system, digital transmission integrity is verified by a technique known as loop-around testing according to which the output of a digital-to-analog decoder and the input of an analog-to-digital encoder at the same end of the transmission channel are temporarily bridged together. A digital test code applied at the decoder input and looped around the temporary bridge is compared to the code received at the encoder output. This prior art technique requires manual intervention in system operation and does not pinpoint the trouble which may lie at any one of many cross-office trunk channels employing the aforementioned encoder-decoder circuit in common.

It would be advantageous to provide, on an in-service basis, an arrangement for automatically verifying the digital transmission properties of individual cross-office channels or trunks across a space-division switching office on an economical and determinative basis.

Prior art transmission path checks on a per-digital channel basis are known in time-division switching networks wherein a channel shifting circuit time-domain matches the two time slots corresponding respectively to the calling and called line circuits. Before the called line circuit is placed in the talk state, a digital test code is applied to the channel shifting circuit and is routed through the network crosspoints associated with the called line circuit, through the called line circuit itself (which has temporarily bridged its transmit and receive portions) and back again through the network crosspoints to another shifting circuit. The received and transmitted test codes are then compared at the processor. This system, however, only checks the called circuit and does not test for network integrity on an end-to-end basis. In addition, the loop-around techniques for continuity path testing in time-division switching systems make use of the fact that the receive and transmit transmission directions are synchronously clocked, thereby allowing the bridging and looping around of a digital test code. Such bridge-and-loop-around techniques are, however, not applicable to the space-division switching system described in the Joel patent which does not require that the common channel multiplexer and demultiplexer be in respective frame synchronization. The aforementioned testing arrangement is thus not readily applicable to a space-division switching network without the inclusion of transmit-receive bridging circuits, comparator equipment and memory buffering at each end of a digital trunk and without the consumption of valuable real time during call processing cycles of the common controller.

It would therefore be advantageous to provide a transmission path continuity check in time-division multiplex systems over a space-division switching network which tests individual trunks on an end-to-end basis without requiring additions of loop-around circuitry, of buffering memories or of processor control real time.

SUMMARY OF THE INVENTION

The foregoing and other objects are achieved in accordance with my invention in one illustrative embodiment thereof in which a space-division, processor-controlled switching system employs a common channel bank to multiplex and demultiplex the T1 bit stream. The demultiplexer serves to distribute the 24 channels of a time-division multiplexed line among 24 digital trunks. Signals present in each channel are sampled in a recurring sequence, one data sample from each channel or 24 samples being transmitted every 125 microseconds. Each sample is comprised of an eight bit digital signal in which the eighth bit or time slot is allocated for the conveyance of channel signalling information during a signalling frame which occurs once every six frames. Twenty-four samples require a total of 192 time slots with an additional 193rd time slot added for the maintenance of frame synchronization. There are 8,000 such frames per second resulting in a pulse repetition rate of 1.544 megabits on the T1 line.

Each digital trunk has a terminal appearance at either end of the central office switch. In the earlier cited Joel patent each such terminal appearance is designated a trunk circuit and, as such, includes both trunk supervision and signalling circuits. In addition, depending on the direction of transmission, the trunk circuit includes registers, flip-flops and counters for raising or lowering the T1 bit repetition rate for cross-office transmission.

In my preferred embodiment the circuits have been rearranged and somewhat different terminology will be employed to reflect the different arrangement. Each terminal appearance is designated a channel terminal circuit and contains three functional subdivisions. The first, herein known as a channel unit, includes a receive buffer for reducing the incoming T1 rate and a transmit buffer for stepping up the outgoing bit rate for signals destined to reach a T1 line. The second, known as the digital trunk circuit, performs the conventional trunk supervision and signalling functions while the third, herein known as an impedance coupler, employs a technique described in R. R. Laane patent No. Re27,798 issued Oct. 30, 1973.

Briefly, the Laane patent technique makes use of impedances at the opposite ends of each crosspoint path that are mismatched so that signal transmission therethrough is accomplished with relatively large current variation while the voltage on the path is maintained at a substantially constant preselected level. In this manner, loss variation and crosstalk are reduced. Each impedance coupler contains a modulator that presents a high input impedance to the incoming side of the network crosspoints in one direction of transmission and a demodulator circuit that presents a low input impedance to the outgoing side thereof in the opposite direction of transmission.

In accordance with the principles of my invention, I have arranged the common channel bank, the channel unit, the impedance coupler and the digital trunk circuit, so that a digital trunk transmission path check can be performed in addition to and substantially concurrently with the conventional D.C. path check. The processor, places the incoming and outgoing digital trunk circuits in the D.C. path check state causing each trunk circuit to respond by raising the voltage bias level on the modulator of its associated impedance coupler. (This does not, however, affect the content of any current modulated signal, the importance of which will hereinafter be made evident.) An independent return path is provided between the outgoing digital trunk circuit and the demodulator of the incoming impedance coupler. Thus, while the conventional D.C. path check is completed with respect to a given side of the switch the trunk circuit also receives a D.C. voltage bias change from the distant end trunk circuit which has been similarly placed in the D.C. path check state.

Further, in accordance with my invention, the successful indication of the D.C. path check at the trunk circuit is relayed via the channel unit during its associated time sample in the outgoing direction to a digital path test circuit in the common channel bank. The latter, in turn, serves to inject a current-modulated digital test code into the channel being checked during its associated time sample in the incoming direction. The test code is then processed at the receive buffer of the associated incoming channel unit circuit and is sent toward the outgoing side common channel bank which, in turn, transmits the same current-modulated digital test code toward the incoming side. Upon receipt of the test code at the multiplexer of a given common circuit, a digital comparison between the transmitted and received test codes is implemented. If the comparison test fails, then the common channel bank through the appropriate channel unit, signals the associated digital trunk circuit to inhibit the indication of a successful D.C. transmission path check to the processor. In addition, the trunk circuit also causes its associated impedance coupler modulator to remove the voltage bias indication on the transmission path towards the distant end impedance coupler demodulator, thereby effectively notifying the distant end trunk circuit of a failure condition.

If this combined D.C. and digital path check fails, the processor repeats the D.C. path check but at the same time suppresses the digital path check so that the failure may be isolated. A repeated failure indication, at this point indicates a lack of D.C. continuity in the switching network while a successful independent D.C. path check indicates a failure in the channel unit. Appropriate diagnostic procedures can then be implemented as necessary.

Thus in accordance with an aspect of my invention the digital integrity of the entire channel terminal circuit may be verified on an in-service basis without slowing down call processing and, when a fault is indicated, the source of the failure may be conveniently isolated.

BRIEF DESCRIPTION OF THE DRAWING

The foregoing and other objects of my invention may become more apparent from the ensuing description and drawings in which:

FIG. 5 shows, in greater detail, the test enable circuits of FIG. 4;

FIG. 6 represents various output waveforms derived from the receive buffer in FIG. 4 and the resultant output waveform at the impedance coupler modulator depicted in FIG. 7;

FIG. 8 is a schematic representation of the digital trunk circuits of the embodiment of FIG. 1 and FIG. 2, respectively; and FIG. 9 schematically represents the positional relationship between FIG. 1 and FIG. 2.

Figure 1:
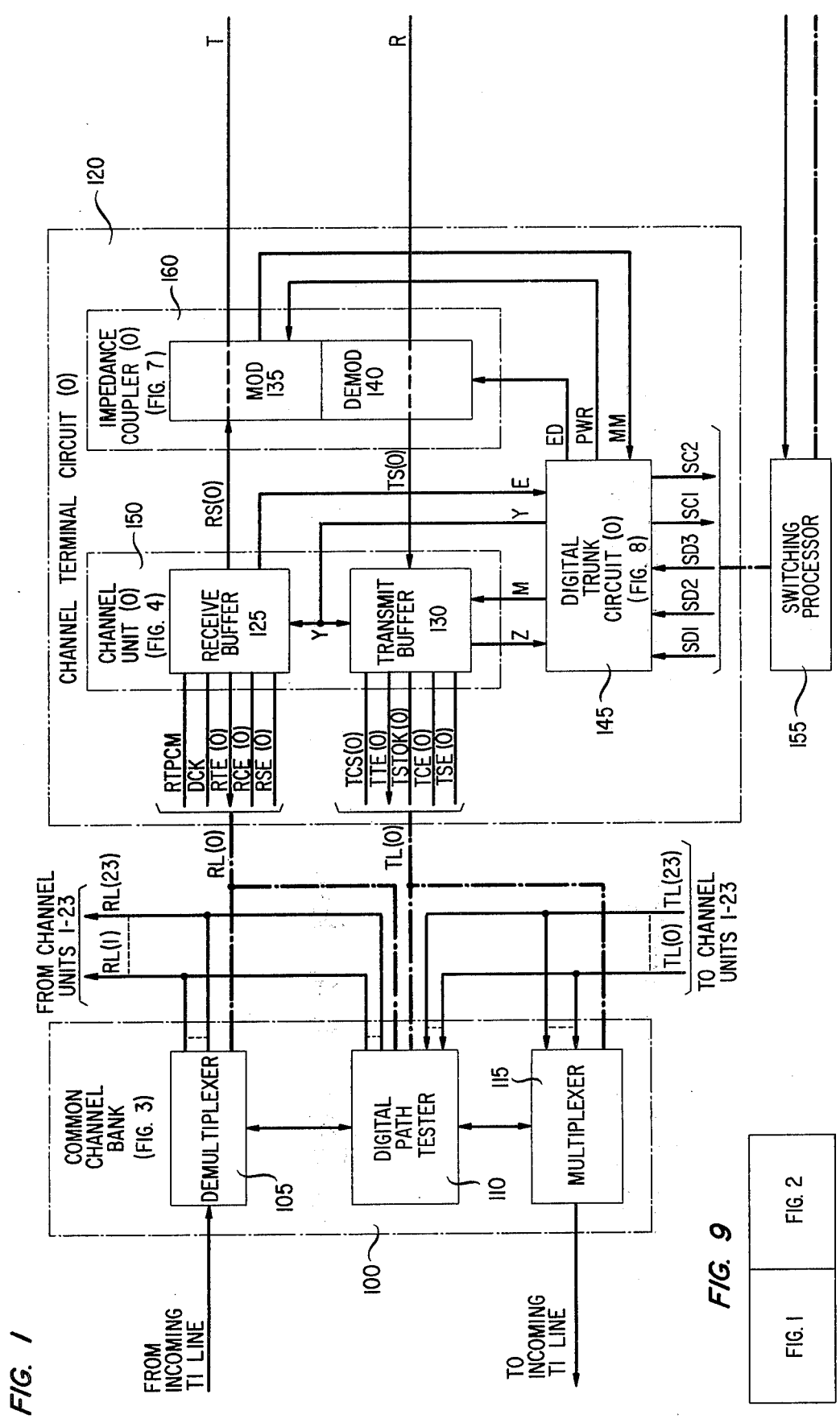
FIG. 1 is a schematic representation of the incoming side of a time-division multiplexed, space-division switched toll or tandem central office in accordance with an illustrative embodiment of my invention showing the details of a channel terminal circuit.

In the drawing, the use of a numerical designation within parenthesis following a circuit name identifies the circuit as serving a particular one of the 24 channels of the T1 line. For example, channel terminal circuit (0) identifies the circuit serving channel (0) of the T1 line. In addition, the convention is also adopted that all circuit and lead designations be indicated by a prime ['] symbol only when referring to the outgoing side of the switch, e.g., outgoing digital trunk circuit'(15), but, e.g., incoming impedance coupler (0) (without a prime).

GENERAL DESCRIPTION OF THE INVENTION

Figure 2:
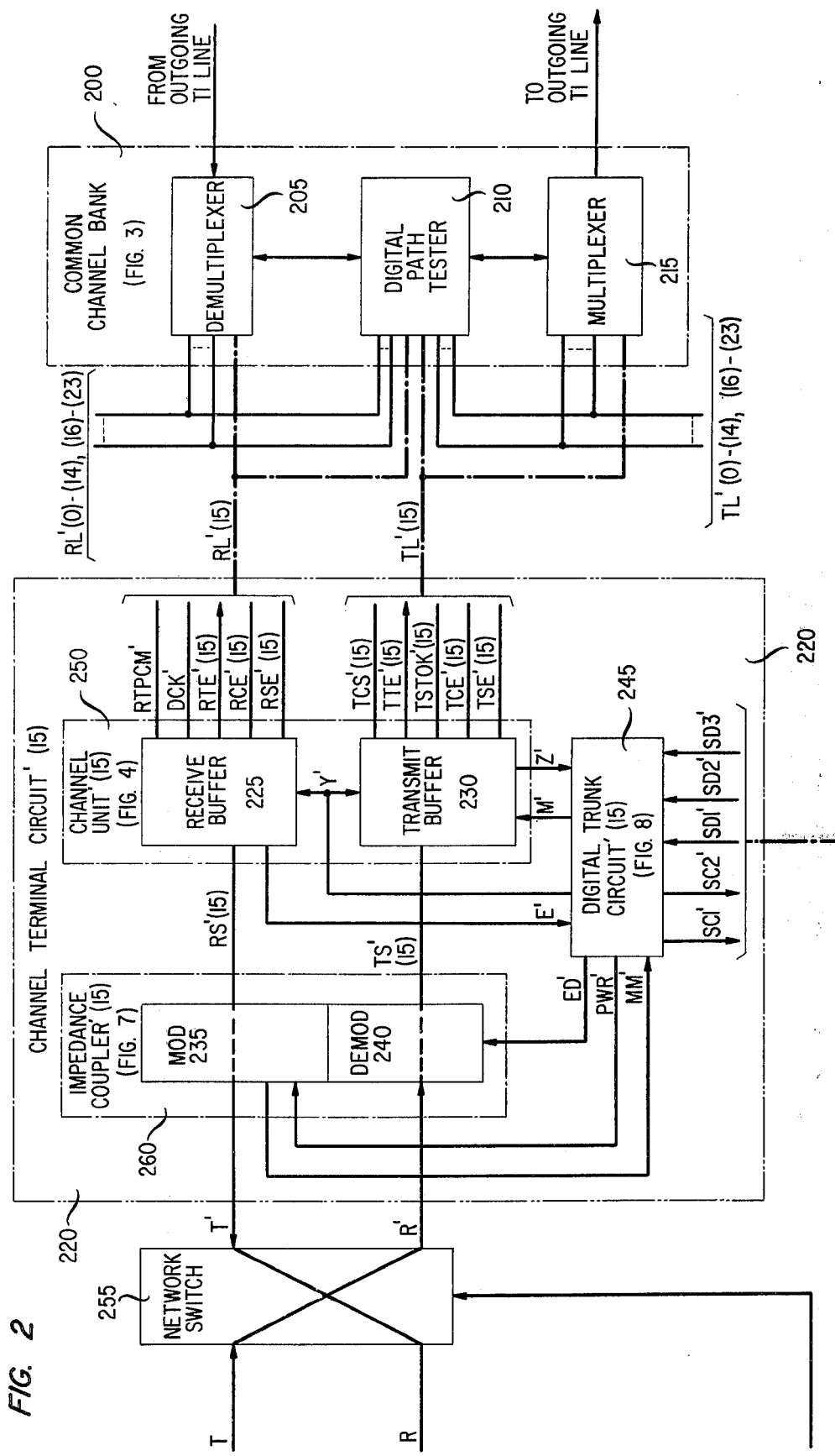
FIG. 2 is a similar schematic representation of the outgoing side of the aforementioned central office.

FIGS. 1 and 2 arranged with FIG. 1 to the left of FIG. 2 depict one specific illustrative embodiment of my invention and specifically show the incoming and outgoing sides of a particular digital trunk in a time-division multiplexed transmission system that employs space-division switching. The switching processor 155 shown in FIG. 1 as well as network switch 255 shown in FIG. 2, may advantageously be units of the No. 1 ESS switching system manufactured by the Western Electric Company, Inc., and described in the *Bell System Technical Journal* of September 1964, Parts 1 and 2. Switching through the central office is in the four-wire mode with independently switched paths available for each direction of transmission.

A call data sample on the incoming T1 line arrives at demultiplexer 105 which is connected to receive buffer 125 of channel unit (0)150 by a group of receive leads RL(0). Lead RTPCM in this group conveys a synchronized, reprocessed version of the input waveform on the incoming T1 line. Lead DCK conveys a line-derived clock waveform having the same bit repetition rate as the T1 line. Lead RCE(0) is energized once each frame to enable receive buffer 125 to process the eight bit data sample then appearing on the RTPCM lead. Lead RSE(O) is enabled during a signalling frame occurring every sixth frame, to identify the eighth bit of the channel data sample that is to be used for trunk supervisory and signalling purposes over the output E lead to incoming digital trunk circuit (O) 145. Lead RTE (0) is used to implement the novel digital path transmission check contemplated by my invention. Similarly, receive lead groups RL (1)-RL (23), as shown in FIG. 1 serve their respective channel terminal circuits (not shown in detail) which are part of common channel bank 100. The channel signal appearing on output lead RS (0) in a demultiplexed form with the cross-office bit rate reduced to 64 kilobits is presented to modulator 135 of impedance coupler 160 and switched through the crosspoints of network switch 255 (FIG. 2). The signal then proceeds through demodulator 240 of outgoing impedance coupler'(15) 260 and is presented to transmit buffer 230 of channel unit'(15) 250. Channel unit 250 reconverts the bit repetition rate of the channel signal to 1.544 megabits and inserts trunk supervisory information provided by the M' lead from outgoing trunk circuit'(15) 245 every signalling frame. Transmit buffer 230 is connected to multiplexer 215 of outgoing common channel bank 200 via lead group TL'(15). In this group, lead TCS'(15) presents the channel signal to digital path tester 210 of outgoing channel bank 200. Lead TCE'(15) provides a channel enable signal generated by multiplexer 215 to enable transmit buffer 230 to process the data sample on lead RS'(15) during each frame. Lead TSE'(15) is enabled during every signalling frame to allow transmit buffer 230 to insert a signalling bit in the eighth bit position of the data sample. Leads TTE'(15) and TSTOK'(15) are used to implement the novel digital path check contemplated by my invention, as will be described hereinafter. Transmit lead groups TL'(1)–(14) and (16)–(23), serve from their respective transmit buffers (not individually shown) which are part of the commonly shared channel bank 200. The data signal on lead TCS'(15) presented to multiplexer 215 is therein reconverted to the 1.544 megabit rate and presented to the outgoing T1 line.

The processing of the data signal in the reverse direction along the same channel, i.e., from the outgoing towards the incoming side, which is presented to demultiplexer 205 from outgoing T1 line (FIG. 2), proceeds analogously through the toll and tandem switching center but in the reverse direction. Thus, signals from demultiplexer 205 are conveyed over receive lead group RL'(15), to channel unit' (15) 250 thereby producing a signal on lead TS'(15) that is current modulated by modulator 235 of impedance coupler (15) 260. The signal is switched through network switch 255 and proceeds through the receive buffer 125 of incoming channel unit (0) 150 via transmit lead group TL(0) and through multiplexer 115 of common channel bank 100 towards the T1 line.

When digital trunk circuit (0) 145 is seized for use, the modulated signal flows from modulator 135 of impedance coupler (0) 160, through network switch 255 and into demodulator 240 of impedance coupler' (15) 260. Similarly, switching processor 155, through leads SD1', SD2' and SD3', causes digital trunk circuit' (15) 245 to turn on the power at modulator 235 by causing lead PWR' to go low.

In order to implement the D.C. path continuity check, switching processor 155 through a signal distributor (not shown) then places digital trunk circuit (0) 145 into the D.C. path check state by imposing the SD1 · $\overline{SD2}$ = 1 configuration thereon. When in this state, a voltage bias signal is applied by lead ED to demodulator 140 on the incoming side. Similarly, a voltage bias signal at demodulator 240 is applied by lead ED' when the processor places trunk circuit' (15) 245 into the D.C. continuity check state which when detected on the incoming side causes lead MM to remain at logic one. Analogously, lead MM' at digital trunk circuit' (15) 245 senses the application of a voltage bias signal applied by lead ED on the incoming side. If the MM (or MM') lead remains at logic one, the associated digital trunk circuit is assured that its modulator is sending out current, that its demodulator is receiving current and that it has received the voltage bias signal from the distant end trunk circuit. A successful path check thus indicated causes lead SC2 of digital trunk circuit (0) 145 to become a logic one, thereby indicating the success of the check to the scanner (not shown) of switching processor 155. If due to any of the aforementioned factors lead MM (or MM') goes low, the failure of the check is indicated by causing lead SC2 to remain at logic zero, thus indicating failure to switching processor 155. Lead ED would then also go low and cause lead MM' at trunk circuit' (15) 245 to also go low, thereby indicating a failure condition on the outgoing trunk circuit as well.

In accordance with the principles of my invention, a digital path check of incoming and outgoing channel terminal circuits may be implemented by causing lead Y at trunk circuit (0) 145 to go high when a positive D.C. path indication is received on the MM lead. During the data sample of channel (0) when lead RCE(0) is at logic one, a logic one on lead Y causes lead RTE(0) to go high. This, in turn, allows digital path tester 110 of common channel bank 100 to insert an eight bit digital test code onto lead RTPCM to be processed in the conventional manner at channel unit (0) 150. A similar operation takes place on the outgoing side wherein lead Y', placed at logic one, because of the logic one appearing at MM', causes lead RTE' (15) to go high, thereby implementing the insertion of a test code onto channel' (15) by digital path tester 210 of common channel bank 200.

At the same time lead Y at coming channel terminal circuit (0) 120 causes lead TTE(0) of transmit buffer 130 to go high during a data sample period when lead TCE(0) has been enabled by an eight bit wide channel enable signal generated by multiplexer 115. The enabling of lead TTE(0) thus accomplished allows the digital test code that was sent from digital path tester 210 through receive buffer 225 on the outgoing side, to be stored at digital path tester 110 when received at multiplexer 115. Path tester 110 then compares the aforementioned digital test code transmitted from the outgoing side to the digital test code stored therein (which had been inserted into receive buffer 125 in the reverse direction). The success of this comparison is indicated on lead TSTOK(0) of transmit buffer 130 whose Z lead to digital trunk circuit (0) 145 which is normally at logic one, is maintained high only if lead TSTOK(0) was high after the data sampling period during which the check was performed. If the comparison is, however unsuccessful, a low on lead TSTOK(0) causes lead Z to go low thereby inhibiting lead SC2 and lead ED at trunk circuit (0) 145 from indicating to switching processor 155 and to channel terminal circuit'(15) 220, respectively, that the D.C. check has been successful. In an analogous manner, a comparison is performed at digital path tester 210 to determine the validity of the digital test code transmitted from incoming channel terminal circuit (0) 120. A low on lead TSTOK'(15) inhibits lead Z' with the effects on leads SC2' and ED' substantially as described with respect to trunk circuit (0) 145 on the incoming side. If a failure condition exists, processor 155 upon scanning of the incoming and outgoing circuits would reinstitute the D.C. path continuity check while inhibiting a digital path check thereby allowing the failure to be isolated.

DETAILED DESCRIPTION OF THE INVENTION

In this embodiment, the format used is similar to that described in the *Bell Laboratories Record* of August 1972, in the article entitled "The D3 Channel Bank," pages 229–233. As noted therein the T1 bit stream is divided into groups of 193 bit segments or frames comprised of eight bit data samples from each of 24 channels and an overall framing bit. The framing bit conveys frame synchronization information to the multiplexer 115 of the common channel bank 100 and informs the individual channel units when a signalling frame has occurred. During such a frame, signalling is superimposed onto the eighth bit of every channel sample. The format is such that a pattern of alternating ones and zeros [ 1010 . . . ] in the framing bit position occurs every other frame and is useful in establishing frame synchronization. In addition, on alternate frames, a code is sent in the framing bit position which is a pattern of three ones followed by three zeros [ 111000 111 . . . ] and is useful in indicating to the receive buffer the appropriate channel unit when this signalling bit is to be extracted and forwarded to the associated digital trunk circuit. The interleaved overall framing code thus has a pattern of [ 110111001000 . . . ] and results in a signalling frame occurring every sixth frame.

Figure 3:
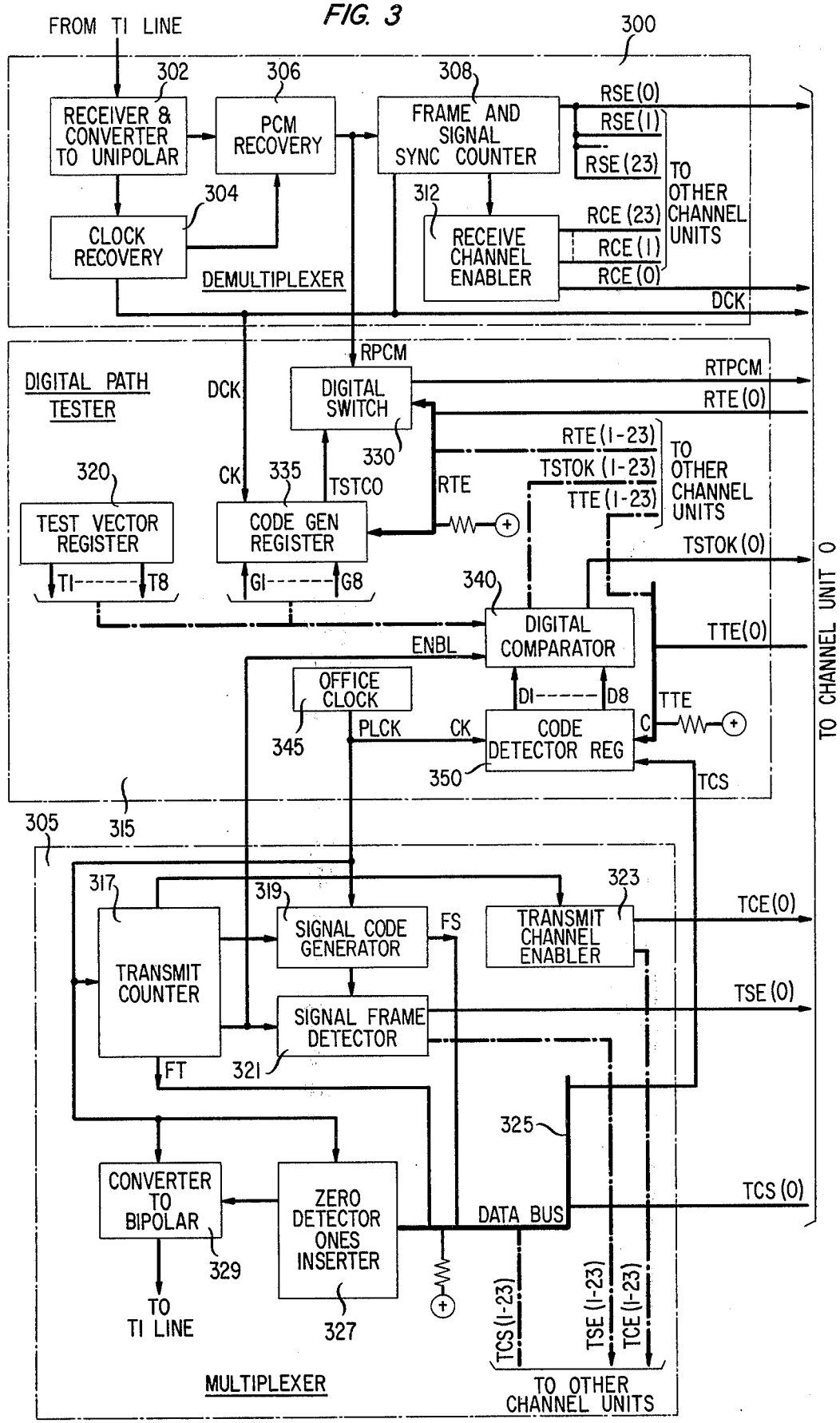
FIG. 3 shows a common channel bank for use in the embodiment of FIG. 1 and FIG. 2 having receive and transmit buffers and a digital path tester.

Referring to FIG. 3, both demultiplexer 300 and multiplexer 305 of the common channel bank are similar to the common equipment circuit described in the *Bell Laboratories Record*, February 1975, article entitled "Mixing Data and Voice on the T1 Line," pages 136–142. Demultiplexer 305 receives incoming signals from the T1 line. Receiver 302 converts the demultiplexed signals to unipolar form and clock recovery circuit 304 provides a 1.544 megabit line-derived clock signal that is used to strobe the incoming unipolar signal at the PCM recovery circuit 306 in the middle of a bit time to decrease the probability of misinterpreting a signal bit. Line-derived timing is described in the October 1972 *Bell System Technical Journal* article entitled "D2 Channel Bank: Digital Functions," pages 1701–1712. The pulse code modulated data signal is then sent to frame and signal synchronization counter 308 in which a digit channel frame counter (not shown), as described in the *Bell System Technical Journal* January 1962, in the article entitled "An Experimental PCM System," on pages 13–16, is employed to derive frame synchronization by looking for a [ 1010 . . . ] pattern at every other framing bit position and for a [ 111000 . . . ] pattern on the alternate framing bit positions. Once the synchronization circuit is in the in-frame mode, the counter locks onto the framing bit pulse and sequentially drives receive channel enabler 312, which drives an eight bit wide receive channel enable pulse, RCE(k) where k can have values from 0 to 23, for each of the 24 associated channel terminal circuits. These pulses when sent to the channel units will enable derived clock lead, DCK to gate in the appropriate eight bit data sample to each channel unit during every frame. A similar procedure is described in the *Bell System Technical Journal*, May/June 1975 in the article entitled "Digital Data System; Digital Multiplexers," pages 893–918. In addition, counter 308 generates receive signal enable pulse, RSE(k), every signalling frame to alert the channel unit that the eighth bit of the code in that frame is to be used for trunk signalling purposes as will hereinafter be described. Frame synchronization as well as provision of channel enable and signal enable pulses are achieved as described in the previously cited *Bell System Technical Journal* article of October 1972 on pages 1704–1708. As will be noted in greater detail hereinafter, during normal call information pulse code modulated or data signal transmission, lead RTE(0) is low (not in the test mode). As a result the content of lead RPCM rather than of lead TSTCD is switched through to output lead RTPCM at digital switch 330.

Figure 4:
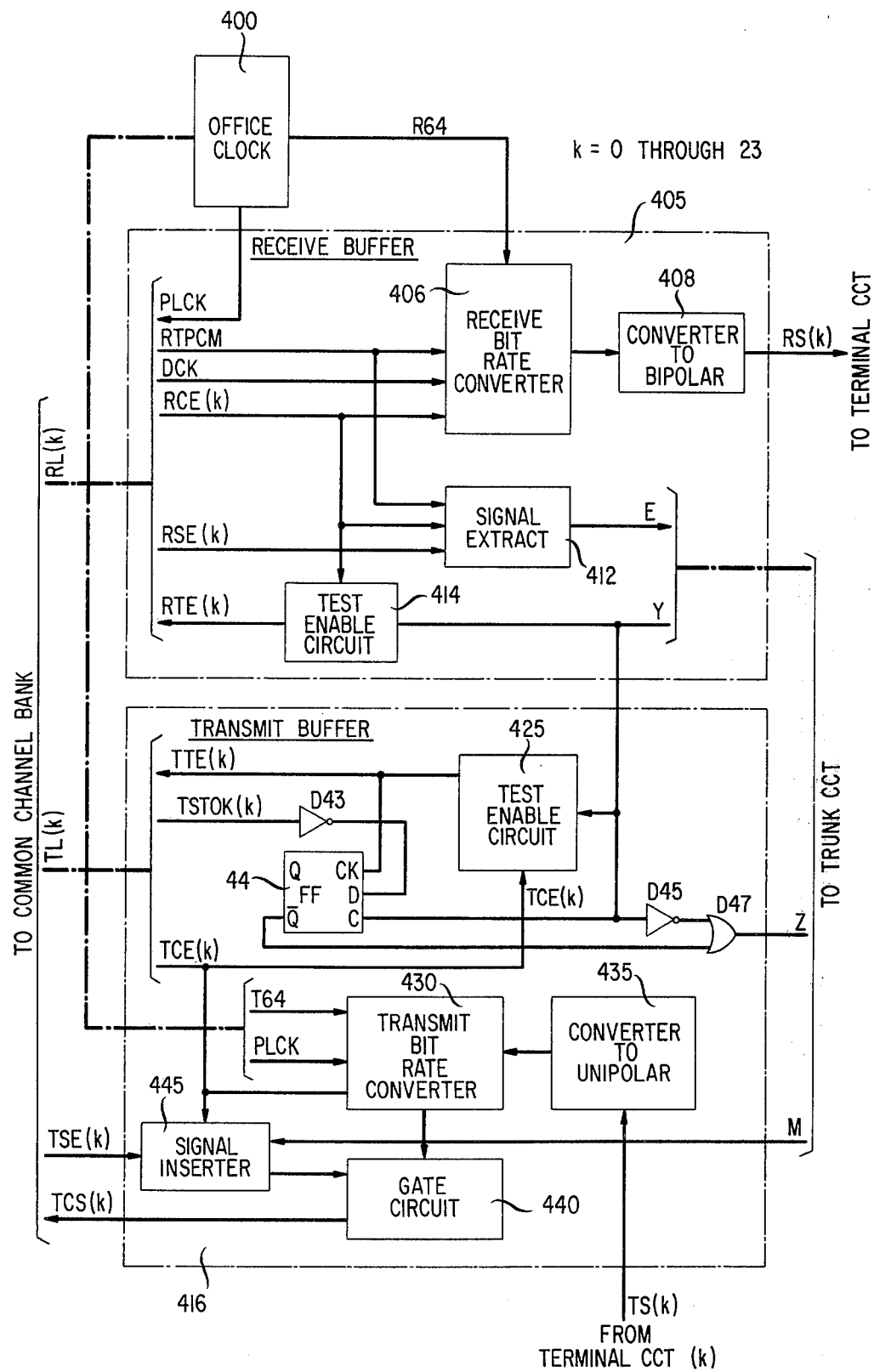
FIG. 4 shows additional details of the receive and transmit buffers in the digital channel units of the embodiment of FIGS. 1 and 2.

In order to parallel the progress of data signals through the digital channel, I now refer to receive buffer 405 of digital channel unit (0) (assuming k=0) shown in FIG. 4. When the RCE(0) signal from demultiplexer 300 is enabled, the receive bit rate converter 406, by employing techniques well known in the prior art, utilizes two eight bit buffer registers to reduce the bit repetition rate for that channel from 1.544 megabits per second to 64 kilobits per second. In the Joel patent arrangement this bit rate conversion function had been performed at the A and D registers of the incoming and outgoing trunk circuits, respectively. In connection with the aforementioned converter circuit 406, the derived clock lead, DCK, taken from multiplexer 300 (FIG. 3) serves to clock in the eight bit sample code present on the RTPCM lead when the RCE(0) lead is enabled. When the RCE(0) lead is not enabled, the R64 lead derived from office clock 400 serves to clock the channel data out of converter circuit 406, to convert the digital signal to the bipolar mode at bipolar converter 408 and to present the resultant signal RS(0) to impedance coupler (0) 150 (FIG. 1). In addition, during a signalling frame which occurs every sixth frame the RSE(0) lead is enabled by frame and signal synchronization counter 308 (FIG. 3) thus allowing signal extract circuit 412 to forward to the trunk circuit via the E lead, signalling information contained in the eighth bit of the data sample for channel (0) appearing on the RTPCM lead.

Continuing to trace the progress of a call data signal, with reference to FIG. 1 and 2, the RS(0) lead, containing the demultiplexed, bit-rate reduced code, serves as an input to modulator 135 of impedance coupler 160 (FIG. 1) in accordance with the deliberate impedance-mismatching principle described in the Laane patent, and as will be described in greater detail hereinafter. Inasmuch as the bit repetition rate of the T1 line is 1.544 megabits per second, it is necessary in order to minimize the required bandwidth, to transmit over the T1 carrier in the bipolar mode whereby logical zeros are sent as a no signal indication and logical ones are sent alternatively as positive and negative signals. This same bipolar transmission scheme is used to transmit 64 kilobit pulses cross-office. The data is however retained in the conventional unipolar mode when it is processed, on either side of the network between the T1 line and the cross-office path through the network switch.

Figure 7:
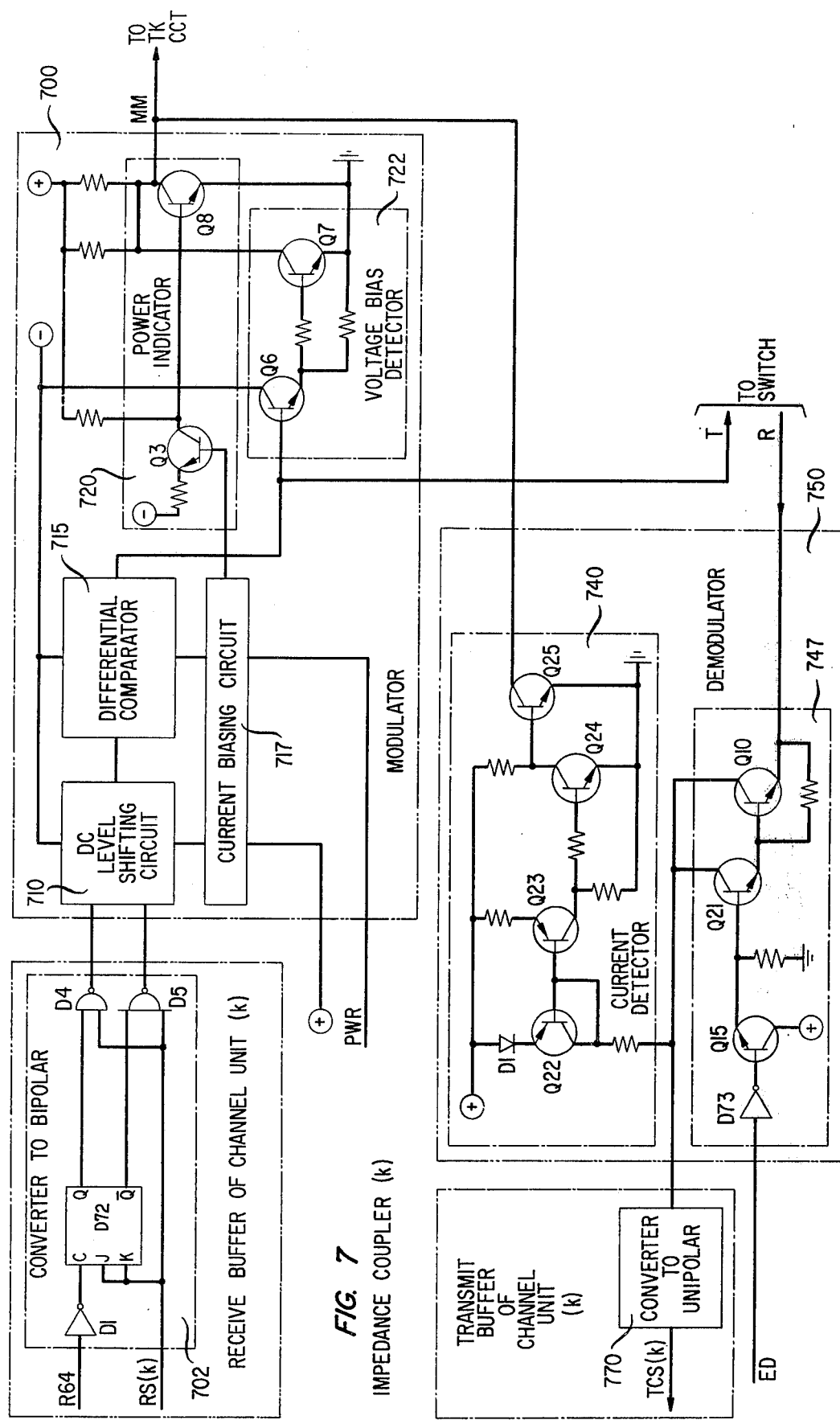
FIG. 7 is a schematic representation of the digital impedance couplers of the embodiment of FIG. 1 and FIG. 2, respectively.

The digital impedance coupler shown in detail in FIG. 7 makes use of the output of bipolar converter 702 circuit which is part of the receive buffer 405 (FIG. 4) of the associated channel unit. In accordance with the Laane patent cited earlier, the outputs of gates D4 and D5 are compared at a differential comparator which presents to the crosspoints of network switch 255 (FIG. 2) a high input impedance and causes the signal to be current modulated. The signal is received at demodulator 240 (FIG. 2) which presents the network switch crosspoints with a low input impedance, further illustrated at demodulator 750 in FIG. 7, whereby the Darlington transistor pair Q10 and Q21 present the low input impedance towards the network switch crosspoints.

In accordance with the operation of impedance coupler (0), call data appearing on lead RS(0) (assuming k=0) is clocked into falling-edge-triggered, J-K toggle flip-flop D72 (FIG. 7) by the inverse of the R64 waveform, $\overline{R64}$, derived at office clock 400 (FIG. 4) and inverted at D1. The operation of flip-flop D72 can be advantageously illustrated by referring to FIG. 6 wherein data sample waveform 6-1, presented on lead RS(0) is initially at a constant logic one. Thus, upon application of a succession of clocking pulses and while lead RS(0) is one, the output of flip-flop D72 and therefore the outputs of NAND gates D4 and D5 change state at every clock pulse $\overline{R64}$ of waveform 6-2. Since data signal RS(0) is logically ANDed with the output flip-flop D72 a zero in input waveform 6-1 causes the outputs of both NAND gates D4 and D5 to be one. When waveform 6-1 is, however, one, the toggling action of flip-flop D72, causes the outputs of D4 and D5 to be opposite with respect to each other after every full clock pulse in clock waveform 6-2. The resultant signals associated with the outputs of NAND gates D4 and D5 respectively, are indicated as waveforms 6-3 and 6-4. When waveforms 6-3 and 6-4, outputs of NAND gates D4 and D5, respectively, are presented for comparison at differential comparator 715 of modulator 700 and lead PWR, the power lead derived from the digital trunk circuit (0) 145 (FIG. 1) is low, the activated current biasing circuit enables differential comparator 700 to compare waveform 6-3 with 6-4 and to yield a three level bipolar, current modulated signal, I shown as waveform 6-5.

The signal is then switched through the crosspoints of network switch 255 and presented to demodulator 250 of impedance coupler' (15) 260 on the outgoing side (FIG. 2). The operation of demodulator 240 may be more closely examined by considering the demodulator 750 of FIG. 7 (assume k=15) which consists of the Darlington transistor pair Q10 and Q21 and which operates to maintain a low input impedance when looking into the emitter of Q10, as indicated in *Electronic Devices And Circuits* by Millman and Halkias 1967, pages 350–352. The output voltage signal is then converted to the unipolar mode at converter 770 transmit buffer 230 of outgoing channel unit' (15) 250 (FIG. 2). There the 64 kilobit data stream is gated into the transmit bit rate conversion circuit 430 (FIG. 4) by a 64 kilobit clock signal on lead T64 in synchronism with the central office clock and is gated out when the TCE' (15) lead is enabled by a 1.544 megabit signal on lead PLCK that is phase-loop locked to office clock 400 in accordance with the circuit operation described in the *Bell System Technical Journal* of March 1962, in the article entitled "Process and Design of the Phase Controlled Oscillator with a Sawtooth Comparator," pages 559–633. In addition, during a signalling frame, the TSE' (15) lead (FIG. 4, k=15) is enabled, whereupon it derives the trunk supervision signal as indicated by the state of the M lead at signal inserter 445 and gates the resultant signalling bit into the eighth bit position of the data sample.

The data signal thus produced at TCS' (15) is presented to the multiplexer 215 (FIG. 2) of outgoing channel bank 200 on lead TCS' (15) over transmit lead group TL' (15) whereby as shown in FIG. 3 all the TCS leads (0 through 23) are wire-ORed onto data bus 325. A transmit counter 317 is utilized (as in the demultiplexer) to sequentially enable the transmit buffers of the 24 associated channel units over leads TCE' (0)-TCE' (23). In addition, transmit counter 317 causes the [1010 . . . ] framing code on the FT lead to be inputted to a logical OR wire whose output appears on data bus 325 and also causes signal code generator 319 to provide the [111000111 . . . ] pattern to data bus 325 via lead FS which is interleaved with the [1010 . . ] pattern on the FT lead and is useful in establishing signalling frames every sixth frame. Before transmission to the T1 line, a check is made to see if too many consecutive zeros, which can cause clocks to go out of synchronization, have been placed on the line. If too many occur, ones inserter 327 inserts enough logical ones to keep the clocks going. Finally, the resultant signal is converted to the bipolar mode for transmission onto the outgoing T1 line.

Information received from the outgoing T1 line in the reverse direction is similarly processed beginning at demultiplexer 205 of outgoing common channel bank 200 and continuing through receive buffer 225 of outgoing channel unit' (15) and modulator 235 of impedance couple' (15) 260. After the channel signal is switched through the network crosspoints, it is passed through demodulator 140 of impedance coupler (0) 160 (FIG. 1), transmit buffer 130 of channel unit (0) 150, multiplexer 115 of incoming common channel bank 100 and out towards the incoming T1 line. Thus, information transmitted in the reverse direction from the outgoing side is processed in a substantially identical manner to the processing of signals from the incoming side as heretofore described.

In order to determine the sequence of operations for implementing a D.C. transmission path check in my preferred embodiment, it is necessary to refer to the operation of the digital trunk circuit (FIG. 8) in conjunction with the impedance coupler (FIG. 7). With reference to FIG. 8, in order to determine the states of the trunk circuit, each lead will be considered to have one of two logic states. As is conventional in electronic switching systems (as described in the September 1964 issue of the *Bell System Technical Journal* relating to the No. 1 Electronic Switching System) the signal distributor points SD1–SD3 which convey instructions from switching processor 155 to the digital trunk circuits 145 and 245 and the scan points SC1–SC2, which indicate to the scanning processor the current state of the trunk circuit, employ a logical zero to correspond to a release or on-hook condition and a logical one to correspond to an operated or off-hook condition, respectively. As shown in FIG. 1, the E lead transfer supervisory information from the associated digital channel to the trunk circuit while the M lead transfers information in the opposite direction. The ED and MM leads respectively transfer supervisory information to and from the far side of switching network 255. The power lead, PWR provides the cut-through function by supplying and removing the bias current for the impedance-mismatched transmission path between the incoming and outgoing impedance couplers 160 and 260. The two scan points, SC1 and SC2 are used to detect and transmit to central control processor 155, via a scanner (not shown), the state of the E and MM leads. The SD1–SD3 points are used to transmit information from central control processor 155 to trunk circuits via a conventional signal distributor (not shown). Referring to FIG. 8, for the E, M, ED and MM leads, a logical one corresponds to an off-hook condition and logical zero corresponds to an on-hook condition. The implementation of the trunk circuit functions is logically performed in accordance with the following Boolean equations:

$$ED = Z \cdot ((E \cdot \overline{SD2} \cdot \overline{SD3}) + (\overline{SD1} \cdot SD2 + SD2 \cdot \overline{SD3})). \quad (1)$$

$$PWR = \overline{SD1} \cdot \overline{SD2}, \quad (2)$$

$$M = SD2 \cdot MM + SD3, \quad (3)$$

$$SC1 = E \quad (4)$$

and $$SC2 = Z \cdot MM \quad (5)$$

For the purposes of the ensuing discussion the Z lead, employed in connection with my digital transmission path check and to be described in a later section is assumed to be at a logic one. Thus, referring to equation (1) the ED lead can operate in two modes. In one mode, e.g., in the talking state, the value of the ED lead is slaved to the value of the E lead which, in turn, is derived from the eighth bit of the corresponding channel sample during a signal frame. This is expressed by the left-hand term of equation (1). The other mode is an on-hook/off-hook mode which entirely depends on the instructions presented by the signal distributor of the common controller or processor as indicated by the right-hand term of equation (1). In order for the switching network to be cut through to the trunk circuit, PWR lead must be at logic zero so that as seen from equation (2), SD1 and SD2 must be at logic zero in order to turn the power off over the transmission path. The M lead, like the ED lead can also function in one mode wherein it is slaved to the value of the MM lead which is determined by supervisory information from the far side of the switching network and in the other mode wherein it directly depends on the value of SD3 (equation (3)). Scan point SC1 indicates to the scanner the state of the E lead (equation (4)) while scan point SC2 reflects the state of the MM lead assuming that the Z lead is at logic one. A design for the logical operations embodied by these equations and the operation of the Y and Z leads described hereinafter is illustrated in FIG. 8.

Referring to FIGS. 1, 2 and 7, the operational sequence of a D.C. transmission path check may be illustrated. Initially, as soon as the incoming trunk circuit is no longer idle, the power is turned on when the PWR lead is caused to go low. As shown in FIG. 7, the PWR lead when at the zero level turns on current biasing circuit 717 which provides controlled current sources to D.C. level shifting circuit 710 and to differential comparator circuit 715 which jointly operate to current modulate the incoming digital sample in accordance with the principles of the Laane patent and as heretofore described. In addition, the current biasing circuit operates power indicator 720 whose output at the collector of Q8 is wire ORed to the MM lead. If power is being supplied and current biasing circuit 717 is providing current towards the central office switch on lead T (FIG. 7), then Q3 is caused to conduct and therefore to cause the base of Q8 to go low, thereby turning off Q8 and causing its output collector to be at a logic one.

It is noted in this regard that the wired logical OR output appearing at lead MM at the modulator will be at logic one only when power indicator 720 and voltage biasing detector 722 in modulator 700 and current detector 740 in demodulator 750 all have outputs at logic one. Thus, when incoming trunk circuit (0) 145 disables the PWR lead power at modulator 135 of impedance coupler (0) 160 (FIG. 1), power is turned on and a bias current is supplied through the network switch and to demodulator 240 of impedance coupler' (15) 260, the latter demodulator may be presently described in greater detail by referring to FIG. 7. As current is received over lead R from the switch, current detector 740 is operated. Diode D1 and diode transistor Q22 having its collector tied to its base, steer the output current of Darlington transistor pairs Q10 and Q21 so as to cause Q23 to conduct. This, in turn, causes Q24 to be driven into saturation which results in the cutoff of Q25 whose collector output, in turn, presents a logic one to the MM' lead of the outgoing impedance coupler' (15) 260.

To summarize what has occurred to this point, digital trunk circuit (0) 145 has responded to the processor's signal distributor indication that the trunk is no longer idle and has caused modulator 135 to send a bias current towards demodulator 240 on the outgoing side. A failure in this regard would drive the MM' lead at demodulator 240 to a logic zero. Similarly, the digital trunk circuit' (15) 245, upon proper indication from the processor's indications on leads SD1'–SD3' turns on the power at outgoing modulator 235. The current detector at incoming modulator 135 indicates this by keeping its MM lead high. Thus, when the call is not in the talk state, the function of the MM lead is to indicate to the trunk circuit that the SC2 scan point is to be at logic one thereby signifying to the processor a successful DC transmission path check. It is, however, not sufficient in establishing a valid path check to provide wired logical OR inputs to the MM output lead which include only the inputs of power indicator 720 and current detector 740 of a given impedance coupler. The former only indicates that the modulator is sending out current but not necessarily that current is being received at the demodulator of the appropriate far end impedance coupler; while the latter merely indicates that current is being received at the demodulator from some distant end modulator. In order to more rigorously establish a D.C. path check between two impedance couplers on opposite sides of a network switch it is also necessary to responsively exchange voltage bias signals therebetween by operating the respective ED leads at each demodulator. As noted earlier, the imposition of a voltage bias onto an impedance-mismatched current-modulation system as described in the Laane patent does not affect the current mode signal content transmitted through the switch.

The actual D.C. path check thus begins when the processor places the SD points at the trunk circuit in an SD1 · $\overline{SD2}$ configuration. Assuming for the moment that the normal state of the Z lead is at logic level one, equation (1) indicates that the ED lead at the digital trunk circuit (0) 145 also be at logic one. As shown in FIG. 7, a logic one from the ED lead causes the output of inverter D73 to be a zero thereby cutting off buffer transistor Q15 and thus biasing the voltage on lead R towards the switch at logic zero. This change in voltage bias is, in turn, detected at the voltage bias detector of modulator 235 on the outgoing side whose operation may be illustrated by referring to FIG. 7. A logical zero from the incoming demodulator passing through the switch and appearing on lead T' of the outgoing modulator operates to successively cut off transistors Q6 and Q7, thereby presenting at the output collector of Q7 a logic one which is provided as an input to the wired logical OR gate output at the MM' lead. A similar voltage bias is applied at ED' lead of demodulator 240 in the opposite direction of transmission (towards the incoming side). Thus, when the processor indicates to trunk circuit' (15) 245 an SD1' · $\overline{SD2'}$ configuration, the ED' lead is turned on and is sensed as a logic one on MM lead of the incoming modulator 125. A successful DC transmission path check is thus indicated by the trunk circuit when its lead configuration is such that MM · SD1 · $\overline{SD2}$ = 1. By also providing as a wired logical OR input the output of voltage bias detector 722 to its MM lead, a given associated trunk circuit is assured not only that its modulator is sending out current towards the network and that its demodulator is receiving current from the network but also that the distant end demodulator has turned on its associated ED lead. The latter indicates that, in addition, the distant end has similarly been placed in the D.C. path check state by the processor. Success of the entire D.C. path check is then reflected as a logic one indication at the SC2 lead of the given trunk circuit which will be recognized during the next scanning cycle by the switching processor.

In accordance with an aspect of my invention, an additional digital transmission path check of the entire operation of both channel terminal circuits on either side of the switch may be accomplished by the addition at the trunk circuit of leads Y and Z (FIG. 8). When the trunk circuit indicates a successful completion of a D.C. path check, i.e., when MM · SD1 · $\overline{SD2}$ = 1, but before the processor has scanned the SC2 lead for such an indication, the Y lead is used to implement a digital path check of channel unit 150 by employing a digital path tester 110 at incoming common channel bank 100 and to report the results of that digital path check via the Z lead to trunk circuit 145. With reference to FIG. 8, the Y lead is enabled the second time after the trunk circuit has been taken out of the idle state, i.e., the second time that a successful D.C. path check is indicated by the configuration MM · SD1 · $\overline{SD2}$ = 1. This is necessary because a standard call setup sequence through a toll or tandem central office requires the attachment of a digit receiver to the incoming channel terminal circuit and the attachment of a digit transmitter to the outgoing channel terminal circuit. These actions occur before the incoming and outgoing channel terminal circuits are cut through to each other through the network switch. When a digit receiver or transmitter, as is necessary, is attached to a channel terminal circuit, a D.C. path check state is indicated by the processor to the associated trunk circuit to test the temporarily created path. At this point in the call sequence, it is therefore not desirable to implement a digital path check between a channel terminal circuit and a digit service circuit. Hence, the Y lead is operated only during end-to-end cut-through when a second D.C. path check is indicated by the processor. As shown in FIG. 8, when the trunk circuit is idle, i.e., when $\overline{SD1}$ · $\overline{SD2}$ · $\overline{SD3}$ · E · $\overline{MM}$ = 1, the output of gate G7 is maintained at zero which serves to clear toggle flip-flop F87 by providing a logic one on the output lead of G4 to the first set input of F87 and a logic zero to the clear input thereof, thereby setting the value of Q at zero. After a digit service circuit has been attached to the channel group circuit, the associated trunk circuit is placed in the SD1 · $\overline{SD2}$ state which indicates the existence of a D.C. path check state. This causes NAND gate G1 to go to zero which, in turn, causes the output of G2 to go high thereby presenting the rising edge of a first input clock pulse to the CK input at F87 which is triggerable on the falling edge of a clock pulse. Thus, the output, Q of F87 remains at zero and the Y lead remains low. After the digit service circuit D.C. path check is completed, leads SD1 and SD2 are both set to zero by the processor and cause the output of NAND gate G1 to go high. Since lead $\overline{Q}$ is at logic one, the output of G2 is at zero and presents the falling edge of the aforementioned first clock pulse to flip-flop F87 thereby toggling it and causing the output Q to change to one. The output of G3 is, however, a zero and, therefore, prevents G5 from going high. When it is subsequently intended, however, to effect a D.C. path check between the two channel terminal circuits across the switch, the processor again places the trunk circuit in the D.C. path check state, i.e., SD1 · $\overline{SD2}$ = 1. This causes G1 to go low thereby turning on G2 which, in turn, gates a rising edge of a second clock pulse to F87. It will be observed that the inputs to gate G5 consists of the Q output of F87 maintained at logic one, the output of G3 presently a one and the MM lead. In accordance with the previously described D.C. path check, success of the check is indicated when the MM lead derived from the modulator of the associated terminal circuit is maintained at a logic one. Thus, if the D.C. path check is successful, G5 is enabled and the output of the Y lead is a one.

Referring to FIG. 1, the Y lead signal is received both at the receive and transmit buffers of channel unit (0) 150. As illustrated in greater detail in FIG. 4 ($k=0$), in receive buffer 405 receive test enabling lead RTE is at logic one in accordance with the operation of test enable circuit 414 having inputs RCE and Y as shown in detail in FIG. 5. The test enable circuit operates to produce a logic one on the output RT lead the second time that lead RCE(k) and lead Y are both one. This is necessary so that output lead RTE(k) is a logical one for the entire data sample period associated with the particular digital channel. Thus, if the Y lead goes high while the RCE(k) lead is already high, the low output of G55 will cause NAND gate G56 to present a rising edge of a clock pulse to toggle flip-flop F51 (which had been initially cleared when Y was still zero). The Q output of flip-flop F51 remains at zero causing the RTE(k) lead to remain low. During the remainder of the frame when the channel enable lead RCE(k) is at zero, gate G55 yields a high output which, in turn, causes gate G56 to go low and to present the falling edge of the aforementioned pulse thereby toggling flip-flop F51 and producing a one on the upper lead of gate G59. At the same time output of inverter G57 presents a low upper input to gate G58 causing lead RTE(k), the output of gate G59, to remain low. Thereafter, since $\overline{Q}$ of flip-flop F51 has gone low, the output of gate G56 goes high and maintains lead Q of flip-flop F51 at logic one regardless of the state of the upper lead of G56. Thus, during the next frame when lead RCE(k) is enabled by the demultiplexer, flip-flop F51 maintains a one at output Q. In that event, however, the output of inverter G57 and output $\overline{Q}$ of cleared flip-flop F52 are both high and therefore sequentially cause gates G58 and G59 to be enabled. This causes output test enable lead RTE(k) to go high which presents the rising edge of a clock pulse to input CK of flip-flop F52. Thus, when RCE(k) goes low again, gate G57 follows suit and at gate G59 causes output lead RTE(k) to go low. This, in turn, causes flip-flop F52 to toggle and to keep gate G58 low as long as input Y remains high. This has the effect of keeping the used of gate G59 low for subsequent channel samples thereby preventing the false re-triggering of the RTE(k) lead. Thus, the test enable circuit serves to produce an eight bit wide RTE(k) pulse during, and only during, the second coincidence of logic ones on leads RCE(k) and Y. This condition continues until the Y lead is turned off by the trunk circuit as will be described hereinafter. The effect of the Y lead going low is to reinitialize flip-flops F51 and F52 at their respective clear inputs, C, for future operations.

Returning to the overall digital path check operation, lead RTE(k) is at logic one during the second channel data sample in which the Y lead had been at logic one. In the case of channel unit (0) 150 on the incoming side, lead RTE(0) serves to operate a digital switch 330 in the digital path tester 315 of the common channel bank (FIG. 3), so that the reprocessed T1 bit stream on lead RPCM is inhibited at switch 330 and lead TSTCD is enabled. Similarly leads RTE(1) through RTE(23) are wired in a logical OR fashion with the output of the OR gate appearing at a common RTE bus and by their sequential nature of operation can only be enabled during their respective eight bit channel data samples in a given frame. Test vector register 320 contains an eight bit test code which may be conveniently selected to optimize code detection and correction capabilities. The enabling of the RTE bus caused by the enabling on one of leads RTE(0)-RTE(23) allows the test code appearing on output leads T1-T8 of test vector register 320 to be gated out in parallel into code generator register 335 at corresponding inputs G1 through G8. Lead DCK containing the 1.544 megabit line-derived waveform is used to sequentially clock out the test code during the data sample period of channel (0) over output lead TSTCD, through digital switch 330 and out over the RTPCM lead. The resultant test code is thus sent to the appropriate channel unit receive buffer when the corresponding RCE(k) lead is energized, in this case channel unit (0), and is processed therein in the same manner as data derived from the RPCM lead had been processed as previously described.

Since in conventional call processing both the incoming and outgoing trunk circuits are placed in the D.C. paths check state substantially simultaneously, the y' lead of outgoing trunk circuit' (15) 245 will respond in a similar fashion to a successful indication of the D.C. path check (MM' · SD1' · $\overline{SD2'}$ = 1 for the second time since the idle state). The Y' lead by enabling its associated RTE lead i.e., lead RTE' (15) (not shown) through test enable circuit 414 will thus similarly cause the same test code to be sent from its test vector register at digital path tester 210 towards incoming channel unit (0) 150.

When the Y lead was enabled by incoming trunk circuit (0) 145, it also served to control test enable circuit 425 in transmit buffer 410 of the channel unit (FIG. 4). The operation of test enable circuit 425 has been previously described with respect to test enable circuit 414 at receive buffer 404 and as shown in greater detail in FIG. 4. Thus, in an analogous manner, lead TTE(0) is at logical one during the second data sample in which the Y lead is a logic one.

The test code which had been inserted by receive buffer 225 of channel unit' (15) 250 is received at transmit buffer 130 of incoming channel unit (0) 150 on TS(0) (FIG. 1) and is subsequently multiplexed at multiplexer 115. Referring to the channel bank in more detail in FIG. 3, leads TTE(0)-TTE(23), each sequentially enabled during their respective channel data sample periods are wired in a logical OR configuration onto a common TTE BUS. When any one of leads TTE(0)-TTE(23) is enabled, the TTE bus presents a logic one to the CR clear lead of code detector register 350 digital path tester 315 thereby activating it. The bit stream appearing at input lead TCS of detector register 350 is derived from data bus 325 in multiplexer 305. Thus, the 1.544 megabit bit stream on lead TCS is normally clocked-in by the 1.544 megabit signal on the PLCK lead (which is phase loop-locked to office clock 345 as described supra). When the RTE bus is low, bits shifted in from the TCS lead are not detected at parallel output leads D1-D8 of detector register 350 which is held cleared. When, however, a D.C. digital path check is in progress on any of channel units (0)-(23), test bits received from outgoing channel unit' (0)-(23) across the network are shifted into the code detector register 350. Digital comparator 340 does a bit-by-bit parallel comparison between the test code derived from test vector register 320 and the parallel outputs D1-D8 from code detector register 350. Lead ENBL derived from transmit counter 370 of multiplexer 305 is enabled during the eighth bit of each channel data sample period and causes digital comparator 340 to output the result of the comparison over leads TSTOK(0)-TSTOK(23) which are inputs to channel units (0)-(23), respectively.

If the comparison is successful, lead TSTOK(0), via inverter D43, goes low on input D of delay flip-flop FF44 (FIG. 4, k=0). Before the Y lead is turned on by its associated trunk circuit, its logic zero value serves to clear flip-flop FF44. When the Y lead is however, turned on and lead TTE(0) is high as heretofore described, a rising edge of a clock pulse is presented to falling edge-triggered flip-flop FF44. Thus, if TSKOK(0), which is enabled only for one bit time, indicates a successful digital path check it causes input D to go low during the eight bit of the associated channel data sample period, i.e., channel (0). Lead TTE(0) which goes low at the end of the eighth bit of that channel sample period in accordance with the operation of test enable circuit 425 presents the falling edge of the aforementioned clock pulse. Thus if the digital path check has been successful, output $\overline{Q}$ of flip-flop FF44 remains at one. Thus before lead y is turned on by the associated trunk circuit flip-flop FF44 presents a constant one on the $\overline{Q}$ output to OR gate D47. When lead Y goes high, flip-flop FF44 is no longer held cleared and may only be operated by presenting the aforementioned rising edge of a pulse that appears on lead TTE(0), by receiving a digital path check failure signal on TSTOK(0) and by thereafter presenting a falling edge of the pulse appearing on lead TTE(0) as the channel sample period is completed. This sequence of operations would cause the $\overline{Q}$ output of flip-flop FF44 to go low. The output of OR gate D47 would, therefore, go low since its upper input is held low by the enabled Y lead through inverter D45 and its lower input is held low by output $\overline{Q}$ of FF44. The output of D47 is the Z lead. When no digital path check is being performed the Y lead is held low at the trunk circuit. Thus, referring to FIG. 8, if the Z lead goes low because of a failure of the digital path check, output gates G8 and G6 would prevent a high output from appearing on output leads ED and SC2, respectively, in accordance with equations (1) and (5).

It therefore follows that if the digital path check is unsuccessful, a positive indication of the D.C. path check, sought by the central controller scanner (not shown) on lead SC2, is inhibited. Similarly, the ED lead is inhibited and causes voltage bias detector 722 (FIG. 7) of the modulator 235 of outgoing impedance coupler'(15) 260 to cause its MM' lead to go low as heretofore described. When the MM' lead at modulator 235 goes low, a successful path check indication by outgoing trunk circuit' (15) 245 on lead SC2' is inhibited. Thus, in the event of a path check failure in either direction, both the incoming and outgoing trunk circuits are inhibited from presenting a positive D.C. path check indication to the processor scanner. The aforementioned circuit actions are of course true in the reverse direction, i.e., in FIG. 2, upon a successful D.C. path check indication the Y' lead is set to one and causes leads RTE'(15), TTE'(15) and TSTOK'(15) to operate on outgoing common channel bank 200 in a manner identical to the operations described with respect to common channel bank 100. To summarize therefore, each side of a digital channel in this time-division multiplex system receives a positive D.C. path check indication at its trunk circuit. This causes a preselected office digital test code to be inserted in the direction towards the switch into the data channel at the multiplexer. In addition, the demultiplexer is made to detect the same test code incoming from the distant channel terminal circuit. Received and transmitted test codes are then compared at the digital path tester and a negative result is relayed via the Z lead to the associated trunk circuit to inhibit a successful D.C. path check indication to the processor at both sides of the digital trunk.

In the preferred embodiment, when the processor receives a failure indication of the D.C. path check it must further determine whether the failure was D.C. or digital in nature. If appropriate modifications to the maintenance and call processing programs or circuits in the central controller are made, a repeat of the D.C. path check with the digital check suppressed can be implemented. This can be accomplished by noting in FIG. 8, that as described supra, the output Y lead only responds to the D.C. path check condition the second time after it has been in the idle condition. Thus, if after a D.C. path check failure, the processor idles the trunk circuit by disconnecting the call, an idle configuration wherein $\overline{SD1} \cdot \overline{SD2} \cdot \overline{SD3} \cdot \overline{E} \cdot \overline{MM} = 1$ results and clears flip-flop F87. The next path check that is done by the processor will therefore not affect the output Y lead. If the second D.C. path check is successful then the failure has been isolated to one of the two channel terminal circuits on either side of the digital channel. If the second D.C. path check is unsuccessful then routine maintenance actions may be implemented to pinpoint the D.C. failure location in the network switch.

Thus, I have shown an illustrative embodiment of my invention in which the integrity of individual digital channel in a time-division multiplexed, digitally switched telecommunications system is checked on an in-service basis. Moreover, I have enabled the digital path check to be implemented over the entire cross-office channel with a minimum of modification, without the additions of per-channel memory and with no significant increase in demand on common control processor real time.

It will be apparent to those of skill in the art that numerous modifications of the embodiment described herein may be made without departing from the spirit or scope of the invention. Thus, for example, it should be apparent that the digital path check is applicable to all local central offices that are switched digitally cross-office and is not necessarily restricted to toll and tandem office applications. In addition, by replacing flip-flop F52 in the test enable circuit, FIG. 5 by a modulo N counter, it is possible to repeat the transmission and detection of the digital test code for a given associated channel over the next N frames, thereby implementing a more accurate digital path check. Further and other modifications of the embodiment will be apparent to those of ordinary skill in the art.

What is claimed is:

1. In a switching system for serving a plurality of digital telecommunications channels carried by input and output time-division multiplex lines and having a switching network for providing switched cross-office connection paths among said multiplexer lines and a common controller for monitoring the state of said cross-office connections, the combination comprising:

a plurality of terminal circuits each having an appearance in said switching network at each end of a respective one of said cross-office paths, means included in each of said terminal circuits for indicating to said common controller whether said respective one of said cross-office paths is electrically continuous, means responsive to the operation of said indicating means for selectively transmitting a digital test code through said terminal circuits, means for receiving said digital test code, from said respective one of said cross-office paths, and means responsive to said receiving means for inhibiting said indicating means when said test code appearing at said receiving means differs from said test code of said transmitting means.

2. The invention in accordance with claim 1 wherein said inhibiting means comprises:

means for comparing said receiving means test code with said transmitting means test code.

3. In a system in accordance with claim 2 the combination further comprising:

a multiplexer having, at one of its sides, an input and an output one of said lines and at the other of its sides said plurality of terminal circuits wherein said means for transmitting and said means for receiving are associated with said one of said sides of said multiplexer.

4. The invention according to claim 3 wherein each of said terminal circuits further comprises:

means coupled to said other of said sides of said multiplexer for transmitting a demultiplexed signal cross-office over said respective one of said paths at a bit transmission rate lower that that existing on said input one of said multiplex lines, and means coupled to said one of said sides of said multiplexer for transmitting a re-multiplexed signal over said output one of said multiplex lines at a bit transmission rate higher than that existing on said respective one of said paths.

5. In a system according to claim 4 the combination wherein said test code transmitting means includes first register means for storing a replica of said test code and for applying said test code to said lower rate transmitting means, wherein said test code receiving means includes second register means for storing said test code received from said higher rate transmitting means, and wherein said comparing means includes digital comparator means for matching said replica of said stored test code of said first register means with said stored test code of said second register means.

6. A switching system comprising
a plurality of digital trunks,
a switching network for interconnecting said trunks,
a processor for controlling said switching network,
means for detecting a voltage bias on said trunks to perform a direct current integrity test thereof,
means responsive to the operation of said last mentioned means for detecting a current modulated signal on said trunks to perform a digital check thereon, and
means responsive to both said voltage bias detecting means and said current modulated signal detecting means for notifying said processor of the results of both said direct current integrity test and said digital check of said trunks.

7. A switching system in accordance with claim 6 further comprising means responsive to said notifying means indicating a failure of said direct current integrity test or said digital check for reenabling said voltage bias detecting means and for inhibiting said current modulated signal detecting means.

8. A time-division multiplex switching system having a common-control processor and a plurality of cross-office trunks comprising:

means for ascertaining the electrical continuity of an individual one of said trunks, signalling means responsive to the operation of said ascertaining means for transmitting a cross-office digital test code at each end of said individual one of said trunks, and means for notifying said processor that said ascertaining means and said test code signalling means have verified said electrical continuity and said test code transmission.

9. The system in accordance with claim 8 wherein said ascertaining means comprises:

means controlled by said processor for imposing a voltage bias signal at said each end of said individual one of said trunks, and means responsive to said imposing means for detecting each said voltage bias signal at the respective opposite end of said individual one of said trunks.

10. The system in accordance with claim 9 wherein said signalling means further comprises:

impedance coupling means associated with each of said cross-office trunks for transmitting said test code at said each end in a current modulated mode of transmission.

11. The invention in accordance with claim 10 wherein said system further comprises a space-division switching network and a common multiplexer at said each end associated with said transmitting means and serving said plurality of cross-office trunks, said multiplexer inserting said test code during the time-division multiplexed time slot associated with said individual one of said trunks.

12. An arrangement for automatically checking the digital trunks of a telecommunications switching office having a processor-controlled switching network comprising:

a plurality of channel terminal circuits each serving a corresponding one of said digital trunks, each of said terminal circuits including, impedance coupling means for applying a first voltage bias signal to said corresponding digital trunk and for detecting a second voltage bias signal from said corresponding digital trunk circuit means normally controlled by said coupling means responsive to the detection of said second voltage bias signal for sending a test verification signal to said processor, means responsive to said circuit means for sending and for detecting a digital test code over said corresponding digital trunk, means for matching said detected test code with said sent test code, and means controlled by said matching means for selectively inhibiting said circuit means from sending said test verification signal.

13. The arrangement of claim 12 wherein said circuit means comprises:

means for disabling said application of said first bias signal when said matching means determines a mismatch.

14. In a space-division switched, time-division multiplexed telecommunications system having an incoming and outgoing multiplexer for distributing a plurality of time-division channels of a time-division multiplexed line among a plurality of space-division trunks, and vice versa, a method for automatically checking the digital performance of one of said trunks comprising,
   placing the incoming and outgoing ends of said one of said trunks in a continuity check state,
   exchanging voltage bias signals between said incoming and outgoing ends of said one of said trunks,
   signalling said multiplexers when said voltage bias signals have been successfully exchanged to apply identical current-modulated digital test codes at each of said ends, and
   comparing said digital test codes received at each of said multiplexers to verify the digital integrity of said one of said trunks.

15. The method of claim 14 further comprising: the steps of:
   normally generating a completion signal when said voltage bias signals and said test codes have been correctly exchanged,
   repeating said exchange of voltage bias signals while inhibiting both the application of said current modulated test codes and the generation of said completion signal when said voltage bias signals or said test codes have not been correctly exchanged, said repeating step serving to isolate the nature and location of fault of said one of said trunks.

16. A method for checking the digital integrity of a switched telecommunications channel established by a common control processor comprising:
   applying a first voltage signal at a first terminal circuit at one end and detecting said first voltage signal at a second terminal circuit at the other end of said channel,
   applying a second voltage signal at said second terminal circuit and detecting said second voltage signal at said first terminal circuit,
   displaying to said processor an indication that said detecting steps at said first terminal circuit and at said second terminal circuit have been completed,
   transmitting substantially concurrently a current-modulated digital test code through said first terminal circuit towards said other end upon detection of said second voltage signal and through said second terminal circuit towards said one end upon detection of said first voltage signal,
   inhibiting nevertheless said indication to said processor of said detection of said first and said second voltages when either said first or said second terminal circuits does not correctly receive said digital test code.

17. A method in accordance with claim 16 wherein said inhibiting step comprises,
   removing said first voltage signal when said first terminal circuit does not correctly receive said test code and said second voltage signal when said second terminal circuit does not correctly receive said test code.

18. A method in accordance with claim 16 wherein said switched channel carries time-division multiplexed signals and is accessed by demultiplexing a particular digital carrier line at first and second common multiplexers situated, respectively, at said one and said other end of said switched channel wherein said transmitting step comprises,
   inserting said test code at said first common multiplexer upon said detection of said second voltage signal and at said second common multiplexer upon said detection of said first voltage signal, and
   validating said test code inserted by said first common multiplexer when received by said second common multiplexer by comparison to a stored replica of said test code and validating said test code inserted by said second common multiplexer when received by said first multiplexer by comparison to said stored replica of said test code.

* * * * *